United States Patent
Geng et al.

(10) Patent No.: US 11,503,207 B2
(45) Date of Patent: Nov. 15, 2022

(54) DISPLAY CONTROL METHOD, DISPLAY CONTROL DEVICE AND COMPUTER-READABLE STORAGE MEDIUM

(71) Applicant: BEIJING XIAOMI MOBILE SOFTWARE CO., LTD., Beijing (CN)

(72) Inventors: Ruyue Geng, Beijing (CN); Wei Nie, Beijing (CN); Tongwei Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 359 days.

(21) Appl. No.: 16/843,467

(22) Filed: Apr. 8, 2020

(65) Prior Publication Data

US 2021/0168282 A1     Jun. 3, 2021

(30) Foreign Application Priority Data

Nov. 29, 2019   (CN) .......................... 201911207699.8

(51) Int. Cl.
*H04N 5/232* (2006.01)
*G06F 1/16* (2006.01)
*G06T 7/44* (2017.01)
*G06T 11/00* (2006.01)

(52) U.S. Cl.
CPC ....... *H04N 5/23229* (2013.01); *G06F 1/1605* (2013.01); *G06T 7/44* (2017.01); *G06T 11/001* (2013.01)

(58) Field of Classification Search
CPC ....... G06T 11/001; G06T 7/44; G06F 1/1605; H04N 5/23229
See application file for complete search history.

(56) References Cited

U.S. PATENT DOCUMENTS

| | | | |
|---|---|---|---|
| 11,037,523 B2* | 6/2021 | Hei | G09G 3/2003 |
| 11,042,184 B2* | 6/2021 | Evans | H01L 27/14627 |
| 2012/0206504 A1 | 8/2012 | Ha et al. | |
| 2017/0076654 A1* | 3/2017 | Wang | G09G 3/2074 |
| 2018/0357749 A1 | 12/2018 | Young et al. | |
| 2020/0195764 A1 | 6/2020 | Xu et al. | |
| 2020/0342571 A1 | 10/2020 | Young et al. | |
| 2021/0280109 A1* | 9/2021 | Xie | H04N 5/23293 |

FOREIGN PATENT DOCUMENTS

| | | |
|---|---|---|
| CN | 109036245 A | 12/2018 |
| CN | 109308866 A | 2/2019 |
| WO | 2019006749 A1 | 1/2019 |

OTHER PUBLICATIONS

Supplementary European Search Report in the European application No. 20177825.5, dated Dec. 8, 2020.

(Continued)

*Primary Examiner* — Antonio A Caschera
(74) *Attorney, Agent, or Firm* — Syncoda LLC; Feng Ma (57) ABSTRACT

A display control method includes: image texture data of a first display area are extracted; a pixel mapping is performed on the image texture data to enable the first display area and the second display area to obtain consistent visual display effects; and the image texture data of the first display area are updated to the pixel-mapped image texture data for displaying.

19 Claims, 6 Drawing Sheets

(56) References Cited

OTHER PUBLICATIONS

William R Mark et al: "The F-buffer", Proceedings Graphics Hardware 2001. ACM SIGGRAPH/Eurographics Workshop on Graphics Hardware; [SIGGRAPH/Eurographics Workshop on Graphics Hardware], ACM, New York, NY, US, Aug. 2001 (Aug. 2001), pp. 57-64, XP058084358, DOI: 10.1145/383507.383527, ISBN: 978-1-58113-407-0 * abstract; figure 1 *.
Office Action of the Indian application No. 202044019874, dated Nov. 8, 2021.

* cited by examiner

DISPLAY CONTROL METHOD, DISPLAY CONTROL DEVICE AND COMPUTER-READABLE STORAGE MEDIUM

CROSS-REFERENCE TO RELATED APPLICATION

This application claims priority to Chinese Patent Application No. 201911207699.8 filed on Nov. 29, 2019, the disclosure of which is hereby incorporated by reference in its entirety.

BACKGROUND

Typically, in order to improve an image capturing effect of a terminal camera, a camera under panel (CUP) scheme is proposed. A display area, provided with a CUP, in a terminal has a low pixel density, so that the image capturing effect of the CUP has a high transparency.

SUMMARY

The present disclosure relates generally to the technical field of display control, and more specifically to a display control method, a display control device, and a computer-readable storage medium.

According to a first aspect of embodiments of the disclosure, a display control method is provided. The display control method can be applied to a terminal. The terminal can include a first display area and a second display area with different pixel densities. The display control method includes: extracting image texture data of the first display area; performing a pixel mapping on the image texture data to enable the first display area and the second display area to obtain consistent visual display effects; and updating the image texture data of the first display area to the pixel-mapped image texture data for display.

According to a second aspect of embodiments of the disclosure, a display control device is provided. The display control device can be applied to a terminal. The terminal can include a first display area and a second display area with different pixel densities. The display control device can include: an extraction portion, configured to extract image texture data of the first display area; a mapping portion, configured to perform a pixel mapping on the image texture data to enable the first display area and the second display area to obtain consistent visual display effects; and a display portion, configured to update the image texture data of the first display area to the pixel-mapped image texture data for display.

According to a third aspect of embodiments of the disclosure, a non-transitory computer-readable storage medium is provided. The storage medium has stored therein instructions that, when executed by a processor of a mobile terminal, causes the mobile terminal to perform the display control method in the first aspect or any examples of the first aspect.

It is to be understood that the above general descriptions and detailed descriptions below are only exemplary and explanatory and not intended to limit the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

The pixel density of the display area provided with the camera under panel (CUP) is inconsistent with those of other display areas, thereby resulting in inconsistent visual display effects.

Figure 1:
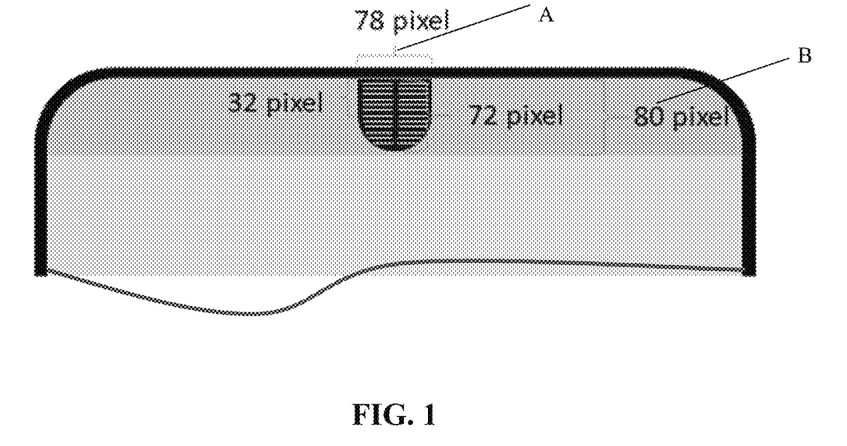
FIG. 1 is a schematic diagram illustrating a display area of a terminal with a camera under panel (CUP), according to some embodiments of the present disclosure.

A display control method in some embodiments of the disclosure is applied to a terminal with a CUP. A pixel density of a display area with a CUP in the terminal with the CUP is inconsistent with that of any one of other display areas, as illustrated in FIG. 1. FIG. 1 illustrates a schematic diagram of a pixel density distribution in a terminal with a CUP. In FIG. 1, each value represents an area density. "Pixel" is the unit of the pixel. Referring to FIG. 1, a display area A is the display area with the CUP. A display area B is another display area adjacent to the display area A. The display area A has a high transparency and a low pixel density in order to maintain an image capturing effect. The display area B is a normal display area of the terminal, and has a high pixel density. The pixel densities of the display area A and the display area B are inconsistent, thereby resulting in inconsistent visual display effects of the display area A and the display area B. The visual effects for a terminal user are also different, and the user experience can be poor.

Image texture data of one of display areas with different pixel densities is extracted, and a pixel mapping/map is performed on the image texture data to obtain display areas with consistent visual display effects. The image texture data of the display area of which/where the image texture data is extracted is updated to the pixel-mapped image texture data for display. The display areas with inconsistent pixel densities can achieve consistent visual display effects.

For convenience of description in the disclosure, display areas with different pixel densities include a first display area and a second display area. As an example for description, the display area of which the image texture data is extracted is the first display area. The implementation process of extracting the image texture data of the second display area is similar, and will not be described in detail in the disclosure.

Figure 2:
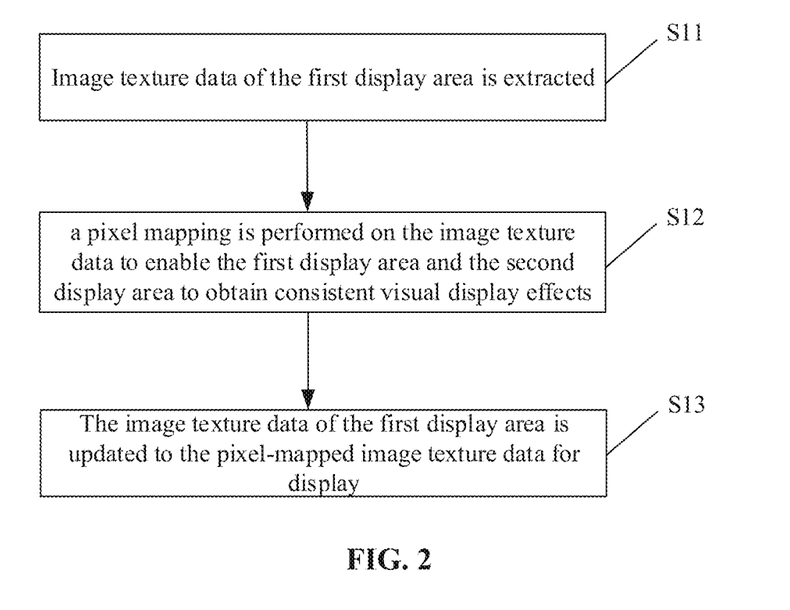
FIG. 2 is a flowchart showing a display control method, according to some embodiments of the present disclosure.

FIG. 2 is a flowchart showing a display control method, according to some embodiments of the present disclosure. As illustrated in FIG. 2, the display control method is applied to a terminal. The terminal includes a first display area and a second display area with different pixel densities. The method includes block S11 to block S13.

In block S11, image texture data of the first display area is extracted.

In block S12, a pixel mapping is performed on the image texture data to enable the first display area and the second display area to obtain consistent visual display effects.

In block S13, the image texture data of the first display area is updated to the pixel-mapped image texture data for display.

In some embodiments of the disclosure, by extracting the image texture data and performing the pixel mapping on the image texture data, consistent visual display effects can be achieved in display areas with inconsistent pixel densities. Further, since the pixel density of the display area is not changed, original functional requirements of the display area corresponding to each pixel density can still be maintained. For example, for a display area with a low pixel density corresponding to a CUP having a high-transparency image capturing requirement, the corresponding image capturing effect can still be achieved when performing image capturing, and a visual display effect consistent with other display areas can be achieved when displaying.

Embodiments of the disclosure describe the display control method in the above embodiments below in combination with practical applications.

In some embodiments of the disclosure, a display area of which image texture data is extracted may be randomly selected as a first display area from display areas with different pixel densities, and the image texture data is extracted and pixel-mapped. In an example, in an application scenario such as a high-transparency display area of a CUP, a display area with a lower pixel density is relatively smaller than a display area with a higher pixel density, and it is easier to perform a pixel mapping operation on the display area with the lower pixel density. Thus, in embodiments of the disclosure, the display area with the lower pixel density may be selected as a first display area for extraction and pixel mapping of image texture data. That is, the pixel density of the first display area of which the image texture data is extracted to be pixel-mapped in some embodiments of the disclosure is lower than the pixel density of the second display area. Of course, embodiments of the disclosure are not limited to this manner. For example, the display area with the higher pixel density may still be selected for extraction and pixel mapping of image texture data.

In embodiments of the disclosure, the first display area and the second display area mentioned above may be adjacent display areas, so as to better improve the poor user experience caused by inconsistent visual display effects of the adjacent display areas.

In some embodiments, the first display area may be an area of setting a CUP, and the second display area may be a display area adjacent to the area of setting the CUP. For example, in FIG. 1, the first display area may be the display area A, and the second display area may be the display area B.

Figure 3:
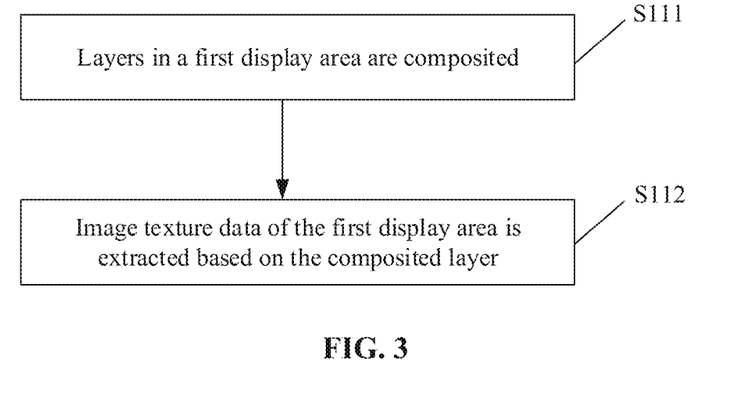
FIG. 3 is a flowchart showing extraction of image texture data, according to some embodiments of the present disclosure.

Further, when extracting the image texture data of the first display area in the above embodiment of the disclosure, the image texture data may be extracted in a manner illustrated in FIG. 3.

FIG. 3 illustrates a flowchart of a method for extracting image texture data, according to some embodiments of the present disclosure. Referring to FIG. 3, the method includes block S111 and block S112.

In block S111, layers in a first display area are composited.

In block S112, image texture data of the first display area is extracted based on the composited layer.

In some embodiments the disclosure, there may usually be a plurality of layers in a display area. For example, there may be layers such as a status bar, a desktop, a wallpaper, and the like in the CUP display area A as illustrated in FIG. 1. Since the visual display effect of the display area is a final visual display effect of all layers that need to be displayed in the display area, in order to better characterize the visual display effect of the display area in some embodiments of the disclosure, all the displayed layers included in the first display area are composited, and the image texture data of the first display area is extracted based on the composited layer.

In some embodiments of the disclosure, during the composition, the layers may be composited in a frame buffer based on layer levels of the layers according to the principle that a higher-level layer is above a lower-level layer.

It can be understood that the process of composition of layers and extraction of image texture data in some embodiments of the disclosure may refer to the conventional art, and will not be described in the disclosure in detail.

In embodiments of the disclosure, composition of layers and extraction of image texture data may be performed in a graphics processing unit (GPU).

Since the GPU is used for parallel computing, the entire line is processed. In embodiments of the disclosure, during a pixel mapping, certain columns in a row are processed. Therefore, when the performing pixel mapping on the image texture data extracted in the GPU in some embodiments of the disclosure, display control may be performed in a manner as illustrated in FIG. 4.

Figure 4:
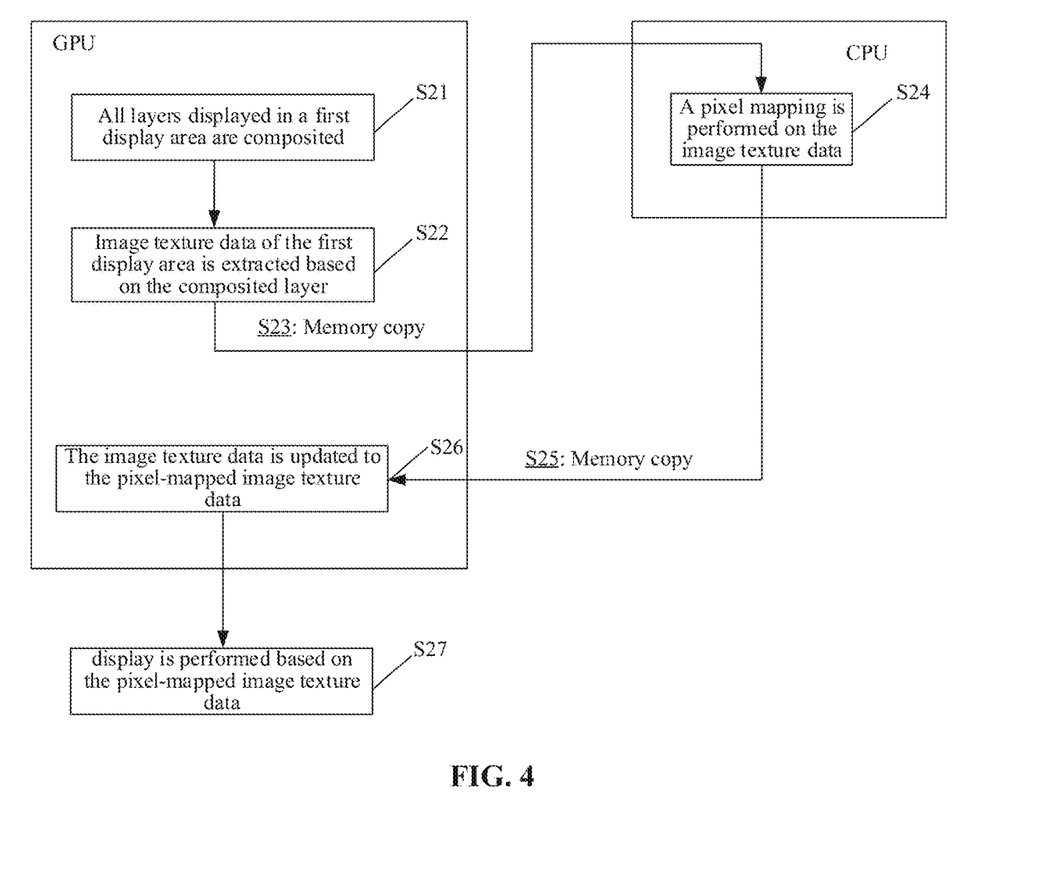
FIG. 4 is a flowchart showing a display control method, according to some embodiments of the present disclosure.

FIG. 4 is a flowchart showing a display control method, according to some embodiments of the present disclosure. Referring to FIG. 4, the method includes the following blocks.

In block S21, all layers displayed in a first display area are composited in a GPU.

In block S22, image texture data of the first display area is extracted in the GPU based on the composited layer.

In block S23, the image texture data extracted in the GPU is copied into a central processing unit (CPU) through a memory.

In block S24, a pixel mapping is performed on the image texture data in the CPU.

In block S25, the image texture data pixel-mapped in the CPU is copied into the GPU through the memory when displaying.

In block S26, the image texture data of the first display area is updated to the pixel-mapped image texture data in the GPU.

In block S27, display of the first display area is performed based on the pixel-mapped image texture data.

In embodiments of the disclosure, layer composition and extraction of image texture data may be performed by the GPU, the pixel mapping is performed in the CPU, and pixel mapping and update of image texture data are implemented by means of memory copy, thereby achieving consistent visual display effects of a plurality of display areas with inconsistent pixel densities without changing the pixel density.

In some embodiments of the disclosure, in order to reduce the manner of memory copying between the CPU and the GPU and to improve the display control efficiency, the pixel mapping may be performed on the extracted image texture data in a shared memory. The pixel-mapped image texture data is acquired from the shared memory, and the image texture data of the first display area is updated to the pixel-mapped image texture data.

Further, in above embodiments of the disclosure, when performing the pixel mapping on the extracted image texture data, the pixel mapping is performed by using a preset pixel mapping policy to obtain display areas with consistent visual display effects.

The pixel mapping policy may be a factory-set default policy. For example, a mode of replacing mapping with a pixel average value may be adopted, or a blur processing mode may be adopted, which is not limited in embodiments of the disclosure.

In some embodiments, when the mode of replacing mapping with a pixel average value is adopted, a pixel value of a pixel point corresponding to the image texture data in the first display area may be, for example, mapped to an average value of pixel values of a set number of pixel points in the second display area.

The pixel points in the second display area used for mapping the pixel value of pixel point corresponding to the image texture data in the first display area may be preset factory values. For example, it may be automatically set by a screen manufacturer according to a screen pixel distribution.

In some embodiments, according to pixel distributions of both the first display area and the second display area, a corresponding positional relationship between positions of the pixel points in the first and second display areas is preset in some embodiments of the disclosure. The pixel value of each pixel point in the first display area may be mapped to a pixel average value of a set number of pixel points at a position in the second display area corresponding to the pixel point position. For example, for a screen with a resolution of 1080p, a pixel point with a pixel coordinate of (1, 530) in the first display area has a corresponding positional relationship with three pixel points with pixel coordinates of (1, 518), (1, 519) and (1, 520) in the second display area. Therefore, when a pixel mapping method according to embodiment of the disclosure is applied, the pixel value of (1, 530) in the first display area may be mapped to a pixel average value obtained by averaging the pixel values of the three pixel points of (1, 518), (1, 519) and (1, 520) in the second display area.

Furthermore, in the above embodiments of the disclosure, in order to improve the mapping accuracy during the pixel mapping, the pixel mapping may be performed in units of pixel frames.

During the pixel mapping, each pixel frame has to be processed, therefore the performance requirements for a terminal are high, which may further affect other functions running in the terminal. For example, in scenarios with high frame rate requirements (such as a high frame rate mode for games), the running of programs with higher frame rate requirements will be affected.

In view of this, in embodiments of the disclosure, a starting control may be provided, and whether the display area is processed to have consistent visual display effects is achieved by activating or deactivating the starting control. When the starting control is activated, the above display control method in each embodiment including extracting image texture data, performing pixel mapping, and updating and displaying the image texture data is performed. When the starting control is deactivated, the display control method according to each embodiment of the disclosure is not executed. The activation or deactivation of the starting control may be set by a user, or may be controlled by the terminal according to a specific application scenario implemented by running an application. For example, in the above game scenario in which the frame rate requirement is relatively high, the starting control may be deactivated.

Based on the same concept, some embodiments of the disclosure further provide a display control device.

It can be understood that, in order to implement the above functions, the display control device in the embodiment of the disclosure includes a corresponding hardware structure and/or software module for performing each function. With reference to units and algorithm blocks of each example disclosed in the embodiments of the disclosure, the embodiments of the disclosure can be implemented in the form of hardware or a combination of hardware and computer software. Whether a certain function is performed by hardware or computer software-driven hardware depends on the specific application of the technical solution and design constraints. Those skilled in the art may use different methods to implement the described functions for each specific application, but such implementation should not be considered to be beyond the scope of the technical solutions of the embodiments of the disclosure.

Figure 5:
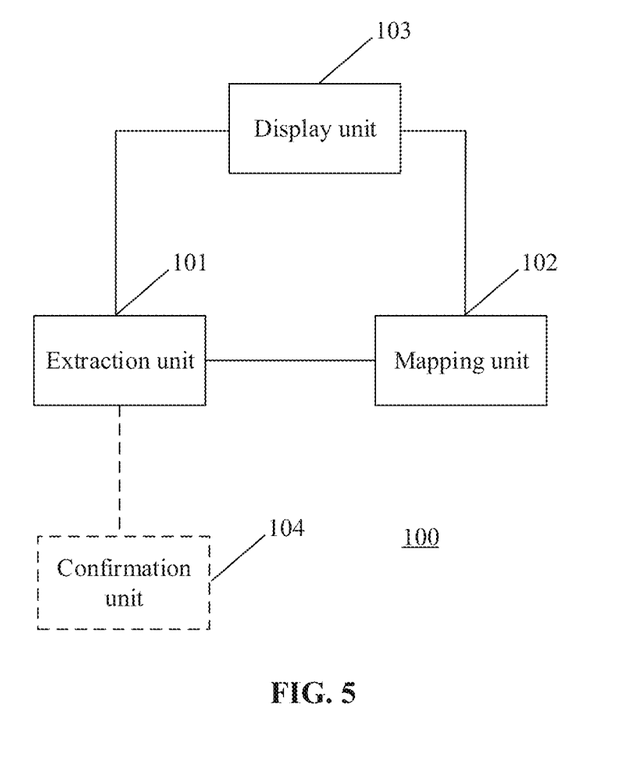
FIG. 5 is a block diagram illustrating a display control device, according to some embodiments of the present disclosure.

FIG. 5 is a block diagram illustrating a display control device, according to some embodiments of the present disclosure. Referring to FIG. 5, a display control device 100 is applied to a terminal. The terminal includes a first display area and a second display area with different pixel densities. The display control device 100 may be a mobile phone, a computer, a digital broadcast terminal, a messaging device, a gaming console, a tablet, a medical device, exercise equipment, a personal digital assistant, and the like.

Referring to FIG. 5, the display control device 100 includes an extraction portion 101, a mapping portion 102 and a display portion 103.

The extraction portion 101 is configured to extract image texture data of the first display area. The mapping portion 102 is configured to perform a pixel mapping on the image texture data to enable the first display area and the second display area to obtain consistent visual display effects. The display portion 103 is configured to update the image texture data of the first display area to the pixel-mapped image texture data for display.

In some embodiments, a pixel density of/at the first display area is lower than a pixel density of the second display area.

In some embodiments, the first display area is an area of setting a CUP, and the second display area is a display area adjacent to the area of setting the CUP.

In some embodiments, the extraction portion 101 is configured to extract the image texture data of the first display area by compositing layers in the first display area and extracting image texture data of the first display area based on the composited layer.

In some embodiments, the extraction portion 101 is configured to extract the image texture data of the first display area in a GPU.

The mapping portion 102 is configured to copy the image texture data extracted in the GPU into a CPU through a memory, and to perform a pixel mapping on the image texture data in the CPU.

The display portion 103 is configured to copy the image texture data pixel-mapped in the CPU into the GPU through the memory, and to update the image texture data of the first display area to the pixel-mapped image texture data in the GPU.

In some embodiments, the mapping portion 102 is configured to perform the pixel mapping on the extracted image texture data in a shared memory. The display portion 103 is configured to acquire the pixel-mapped image texture data from the shared memory, and to update the image texture data of the first display area to the pixel-mapped image texture data.

In some embodiments, the display control device 100 further includes a confirmation portion 104. The confirmation portion 104 is configured to: confirm, before the extraction portion 101 extracts the image texture data of the first display areas, that a starting control for processing the display areas to have consistent visual display effects is activated.

In some embodiments, the mapping portion 102 is configured to perform the pixel mapping on the image texture data to enable the first display area and the second display area to obtain consistent visual display effects by mapping a pixel value of a pixel point corresponding to the image texture data in the first display area to an average value of pixel values of a set number of pixel points in the second display area.

In some embodiments, the set number of pixel points may be obtained according to at least one of a pixel distribution of the first display area or a pixel distribution of the second display area.

Regarding the device in the above embodiment, the specific manner in which each module performs operations has been described in detail in the embodiment about the method, and detailed descriptions are omitted herein.

Figure 6:
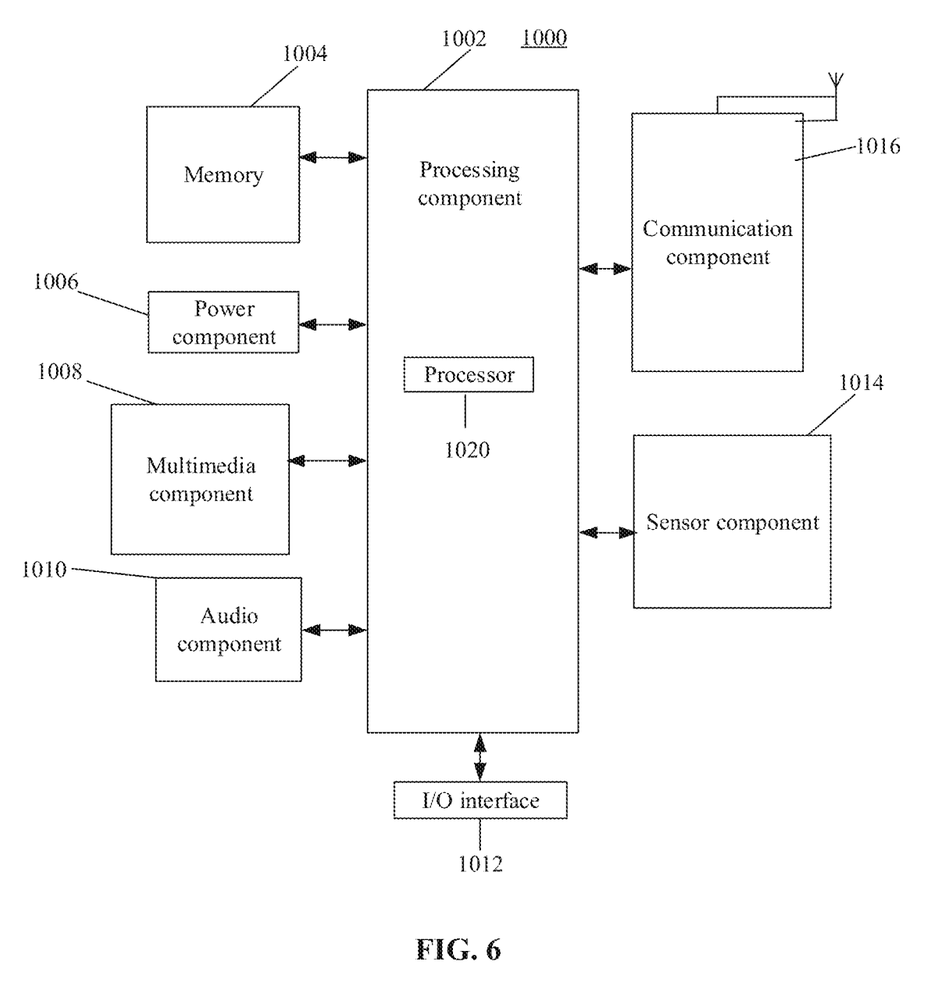
FIG. 6 is a block diagram illustrating a device, according to some embodiments of the present disclosure.

FIG. 6 is a block diagram illustrating a device 1000 for display control, according to some embodiments of the present disclosure. For example, the device 1000 may be a mobile phone, a computer, a digital broadcast terminal, a messaging device, a gaming console, a tablet, a medical device, exercise equipment, a personal digital assistant, and the like.

Referring to FIG. 6, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as operations associated with display, telephone calls, data communications, camera operations, and recording operations. The processing component 1002 may include one or more processors 1020 to execute instructions to perform all or part of the blocks in the above described methods. Moreover, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). In some embodiments, organic light-emitting diode (OLED) or other types of displays can be employed. If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 1008 includes a front camera and/or a rear camera. The front camera and/or the rear camera may receive an external multimedia datum while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC). The MIC is configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For example, the sensor component 1014 may detect an open/closed status of the device 1000, and relative positioning of components. For example, the component is the display and the keypad of the device 1000. The sensor component 1014 may also detect a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a complementary metal oxide semiconductor (CMOS) or charge coupled device (CCD) image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 may access a wireless network based on a communication standard, such as Wi-Fi, 2G, 3G, 4G, 5G or a combination thereof. In some embodiments, the communication component 1016 receives a broadcast signal or broadcast associated information from an external broadcast management system via a broadcast channel. In some embodiments, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above described methods.

In some embodiments, there is also provided a non-transitory computer-readable storage medium including instructions, such as included in the memory 1004, executable by the processor 1020 of the device 1000, for performing the above-described methods. For example, the non-transitory computer-readable storage medium may be a ROM, a compact disc read-only memory (CD-ROM), a magnetic tape, a floppy disc, an optical data storage device, and the like.

The various device components, modules, units, blocks, or portions may have modular configurations, or are composed of discrete components, but nonetheless can be referred to as "modules" or "portions" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A display method, applied to a terminal comprising a first display area and a second display area with different pixel densities, the display method comprising:
    extracting image texture data of the first display area;
    performing a pixel mapping on the image texture data to enable the first display area and the second display area to obtain consistent visual display effects; and
    updating the image texture data of the first display area to the pixel-mapped image texture data for displaying;
    wherein the extracting image texture data of the first display area comprises:
    compositing layers in the first display area to generate a composited layer, and extracting the image texture data of the first display area based on the composited layer.

2. The display method of claim 1, wherein the performing a pixel mapping on the image texture data to enable the first display area and the second display area to obtain consistent visual display effects comprises:
    mapping a pixel value of a pixel point corresponding to the image texture data in the first display area to an average value of pixel values of a set number of pixel points in the second display area.

3. The display method of claim 2, wherein the set number of pixel points are obtained according to at least one of a pixel distribution of the first display area or a pixel distribution of the second display area.

4. The display method of claim 1, wherein a pixel density of the first display area is lower than a pixel density of the second display area.

5. The display method of claim 4, wherein the first display area is an area of setting a camera under panel (CUP); and
    the second display area is a display area adjacent to the area of setting the CUP.

6. The display method of claim 1, wherein the image texture data of the first display area is extracted in a graphics processing unit (GPU);
    wherein the performing a pixel mapping on the image texture data comprises:
    copying the image texture data extracted in the GPU into a central processing unit (CPU) through a memory, and performing the pixel mapping on the image texture data in the CPU;
    wherein the updating the image texture data of the first display area to the pixel-mapped image texture data comprises:
    copying the image texture data pixel-mapped in the CPU into the GPU through the memory; and
    updating the image texture data of the first display area to the pixel-mapped image texture data in the GPU.

7. The display method of claim 1, wherein the performing a pixel mapping on the image texture data comprises:
    performing the pixel mapping on the extracted image texture data in a shared memory;
    wherein the updating the image texture data of the first display area to the pixel-mapped image texture data comprises:
    acquiring the pixel-mapped image texture data from the shared memory, and updating the image texture data of the first display area to the pixel-mapped image texture data.

8. The display method of claim 1, wherein prior to the extracting the image texture data of the first display area, the method further comprising:
    confirming that a starting control processing the display areas to have consistent visual display effects is activated.

9. A mobile terminal implementing the method of claim 1, comprising:
    a display panel having the first display area and the second display area, wherein a pixel density of the first display area is lower than a pixel density of the second display area;
    a camera under panel (CUP) at the first display area;
    a graphic processing unit (GPU); and
    a central processing unit (CPU);
    wherein the mobile terminal is configured to control activation of the display method and deactivation of the display method;
    wherein the deactivation is performed in a gaming scenario wherein frame rate requirement is high; and
    upon the activation, the GPU is configured to:
    composite all layers displayed in the first display area;
    extract the image texture data of the first display area based on the composited layers; and
    copy the image texture data extracted in the GPU into a shared memory;
    a central processing unit (CPU) through a memory;

the CPU is configured to:
perform the pixel mapping on the image texture data;
wherein the pixel mapping is performed by using a preset pixel mapping policy to realize the consistent visual display effects for the first display area with higher pixel density and the second display area with lower pixel density.

10. A display device, applied to a terminal comprising a first display area and a second display area with different pixel densities, the display device comprising:
a processor; and
memory for storing instructions executable by the processor;
wherein the processor is configured to:
extract image texture data of the first display area;
perform a pixel mapping on the image texture data to enable the first display area and the second display area to obtain consistent visual display effects; and
update the image texture data of the first display area to the pixel-mapped image texture data for displaying;
wherein the processor is configured, when extracting image texture data of the first display area, to:
composite layers in the first display area to generate a composited layer, and extract the image texture data of the first display area based on the composited layer.

11. The display device of claim 10, wherein the processor is configured, when performing a pixel mapping on the image texture data to enable the first display area and the second display area to obtain consistent visual display effects, to:
map a pixel value of a pixel point corresponding to the image texture data in the first display area to an average value of pixel values of a set number of pixel points in the second display area.

12. The display device of claim 11, wherein the set number of pixel points are obtained according to at least one of a pixel distribution of the first display area or a pixel distribution of the second display area.

13. The display device of claim 10, wherein a pixel density of the first display area is lower than a pixel density of the second display area.

14. The display device of claim 13, wherein the first display area is an area of setting a camera under panel (CUP); and
the second display area is a display area adjacent to the area of setting the CUP.

15. The display device of claim 10, wherein the processor is configured to extract the image texture data of the first display area in a graphics processing unit (GPU);
wherein the processor is configured, when performing a pixel mapping on the image texture data, to:
copy the image texture data extracted in the GPU into a central processing unit (CPU) through a memory, and perform the pixel mapping on the image texture data in the CPU;
wherein the processor is configured, when updating the image texture data of the first display area to the pixel-mapped image texture data, to:
copy the image texture data pixel-mapped in the CPU into the GPU through the memory; and
update the image texture data of the first display area to the pixel-mapped image texture data in the GPU.

16. The display device of claim 10, wherein the processor is configured, when performing a pixel mapping on the image texture data, to:
perform the pixel mapping on the extracted image texture data in a shared memory;
wherein the processor is configured, when updating the image texture data of the first display area to the pixel-mapped image texture data, to:
acquire the pixel-mapped image texture data from the shared memory, and update the image texture data of the first display area to the pixel-mapped image texture data.

17. The display device of claim 10, wherein the processor is further configured to:
confirm, prior to the extracting the image texture data of the first display area, that a starting control processing the display areas to have consistent visual display effects is activated.

18. A non-transitory computer-readable storage medium having stored therein instructions that, when executed by a processor of a mobile terminal, causes the mobile terminal to perform a display method applied to a terminal comprising a first display area and a second display area with different pixel densities, the display method comprising:
extracting image texture data of the first display area;
performing a pixel mapping on the image texture data to enable the first display area and the second display area to obtain consistent visual display effects; and
updating the image texture data of the first display area to the pixel-mapped image texture data for displaying;
wherein the extracting image texture data of the first display area comprises:
compositing layers in the first display area to generate a composited layer, and extracting the image texture data of the first display area based on the composited layer.

19. The non-transitory computer-readable storage medium of claim 18, wherein the performing a pixel mapping on the image texture data to enable the first display area and the second display area to obtain consistent visual display effects comprises:
mapping a pixel value of a pixel point corresponding to the image texture data in the first display area to an average value of pixel values of a set number of pixel points in the second display area.

* * * * *